United States Patent
Ishikawa

(10) Patent No.: US 8,225,118 B2
(45) Date of Patent: Jul. 17, 2012

(54) SERVER SYSTEM, REDUCING METHOD OF POWER CONSUMPTION OF SERVER SYSTEM, AND A COMPUTER READABLE MEDIUM THEREOF

(75) Inventor: Tomoyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 533 days.

(21) Appl. No.: 12/354,626

(22) Filed: Jan. 15, 2009

(65) Prior Publication Data

US 2009/0187775 A1   Jul. 23, 2009

(30) Foreign Application Priority Data

Jan. 18, 2008   (JP) .................................... 2008-9706

(51) Int. Cl.
*G06F 1/26* (2006.01)

(52) U.S. Cl. ........ 713/320; 713/300; 713/310; 713/323; 713/324; 718/1

(58) Field of Classification Search .............. 713/1, 300, 713/310, 320, 322, 324; 718/1; 709/222, 709/223

See application file for complete search history.

(56) References Cited

U.S. PATENT DOCUMENTS

| | | | | |
|---|---|---|---|---|
| 7,225,441 B2 * | 5/2007 | Kozuch et al. ..................... 718/1 |
| 7,644,148 B2 * | 1/2010 | Ranganathan et al. ........ 709/223 |
| 7,802,251 B2 * | 9/2010 | Kitamura ........................... 718/1 |
| 7,856,549 B2 * | 12/2010 | Wheeler ............................ 713/1 |
| 7,861,102 B1 * | 12/2010 | Ranganathan et al. ........ 713/300 |
| 7,962,587 B2 * | 6/2011 | Tripathi ........................ 709/222 |
| 8,046,600 B2 * | 10/2011 | Holle et al. .................... 713/300 |
| 2005/0060590 A1 * | 3/2005 | Bradley et al. ................ 713/320 |
| 2005/0251802 A1 * | 11/2005 | Bozek et al. ....................... 718/1 |
| 2009/0070771 A1 * | 3/2009 | Yuyitung et al. .............. 718/105 |
| 2009/0106409 A1 * | 4/2009 | Murata ........................ 709/223 |
| 2009/0106571 A1 * | 4/2009 | Low et al. ..................... 713/310 |
| 2009/0150700 A1 * | 6/2009 | Dell'Era ....................... 713/324 |
| 2009/0172125 A1 * | 7/2009 | Shekhar et al. ............... 709/215 |
| 2009/0204826 A1 * | 8/2009 | Cox et al. ..................... 713/320 |
| 2009/0327781 A1 * | 12/2009 | Tripathi ....................... 713/324 |
| 2010/0070784 A1 * | 3/2010 | Gupta et al. .................. 713/310 |
| 2010/0115509 A1 * | 5/2010 | Kern et al. ....................... 718/1 |
| 2010/0180275 A1 * | 7/2010 | Neogi et al. ..................... 718/1 |
| 2011/0213997 A1 * | 9/2011 | Kansal et al. ................ 713/324 |

FOREIGN PATENT DOCUMENTS

| | | |
|---|---|---|
| JP | 2005267635 A | 9/2005 |
| JP | 2007179437 A | 7/2007 |
| JP | 2007213167 A | 8/2007 |
| JP | 2007272297 A | 10/2007 |
| JP | 2007310791 A | 11/2007 |

OTHER PUBLICATIONS

Kansal et al. Virtual Machine Power Metering and Provisioning. ACM. Jun. 10, 2010.*
Kim et al. Power-Aware Provisioning of Virtual Machines for Real-Time Cloud Services. Dec. 30, 2010.*
Cisco. Virtual Machine Mobility with VMware VMotion and Cisco Data Center Interconnect Technologies. 2009.*
Japanese Office Action for JP2008-009706 issued Oct. 27, 2009.

* cited by examiner

*Primary Examiner* — Matthew D Spittle

(57) ABSTRACT

A server system comprises a plurality of servers, and a management unit. Each of the servers has virtual machines which can move among the servers. The management unit moves all the virtual machines on one server to another server(s) based on information showing an electric power value so as to reduce the number of servers in operation as much as possible. The management unit stops supplying the electric power to the server on which no virtual machine has run as a result of the movement of the virtual machines.

13 Claims, 8 Drawing Sheets

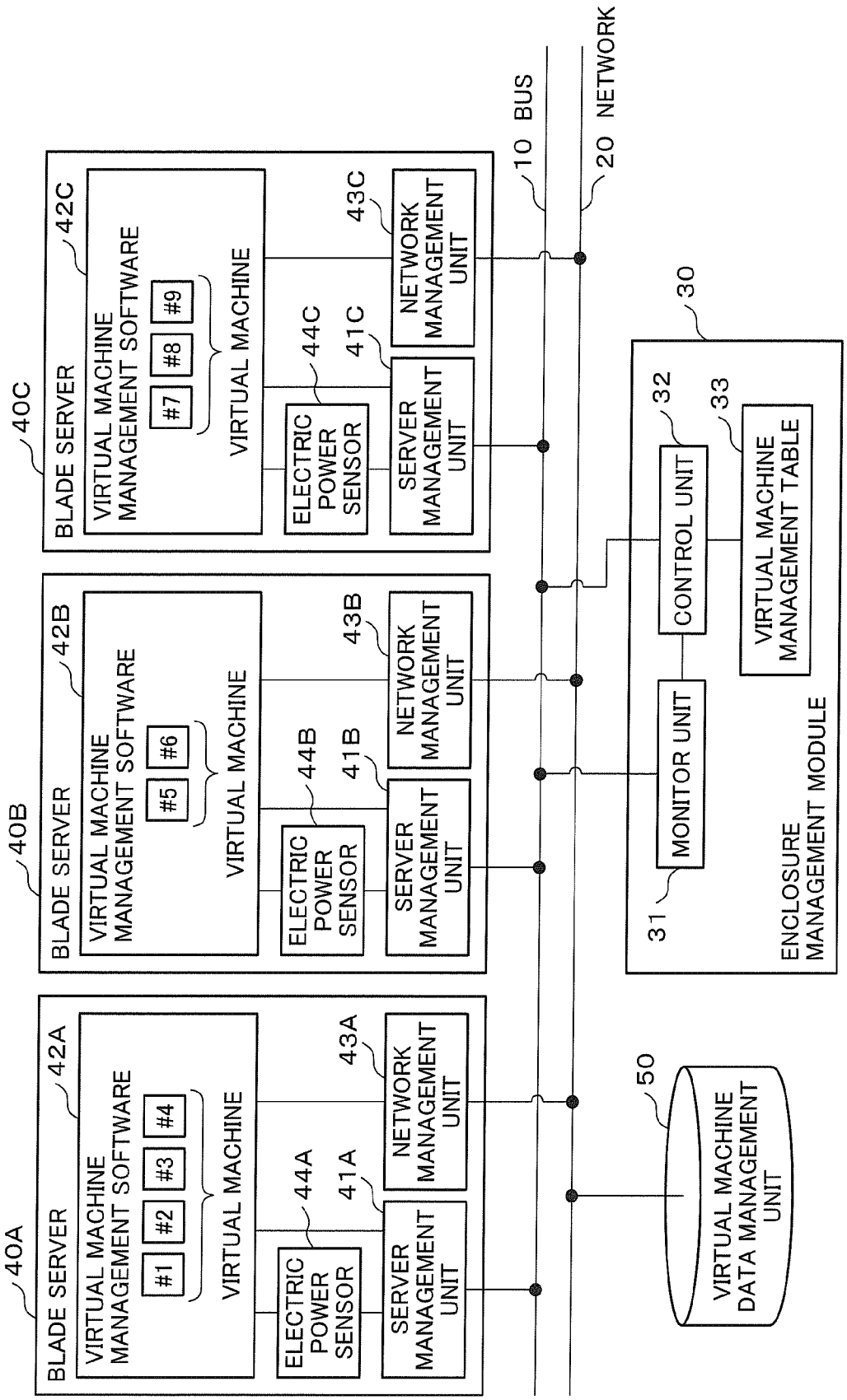

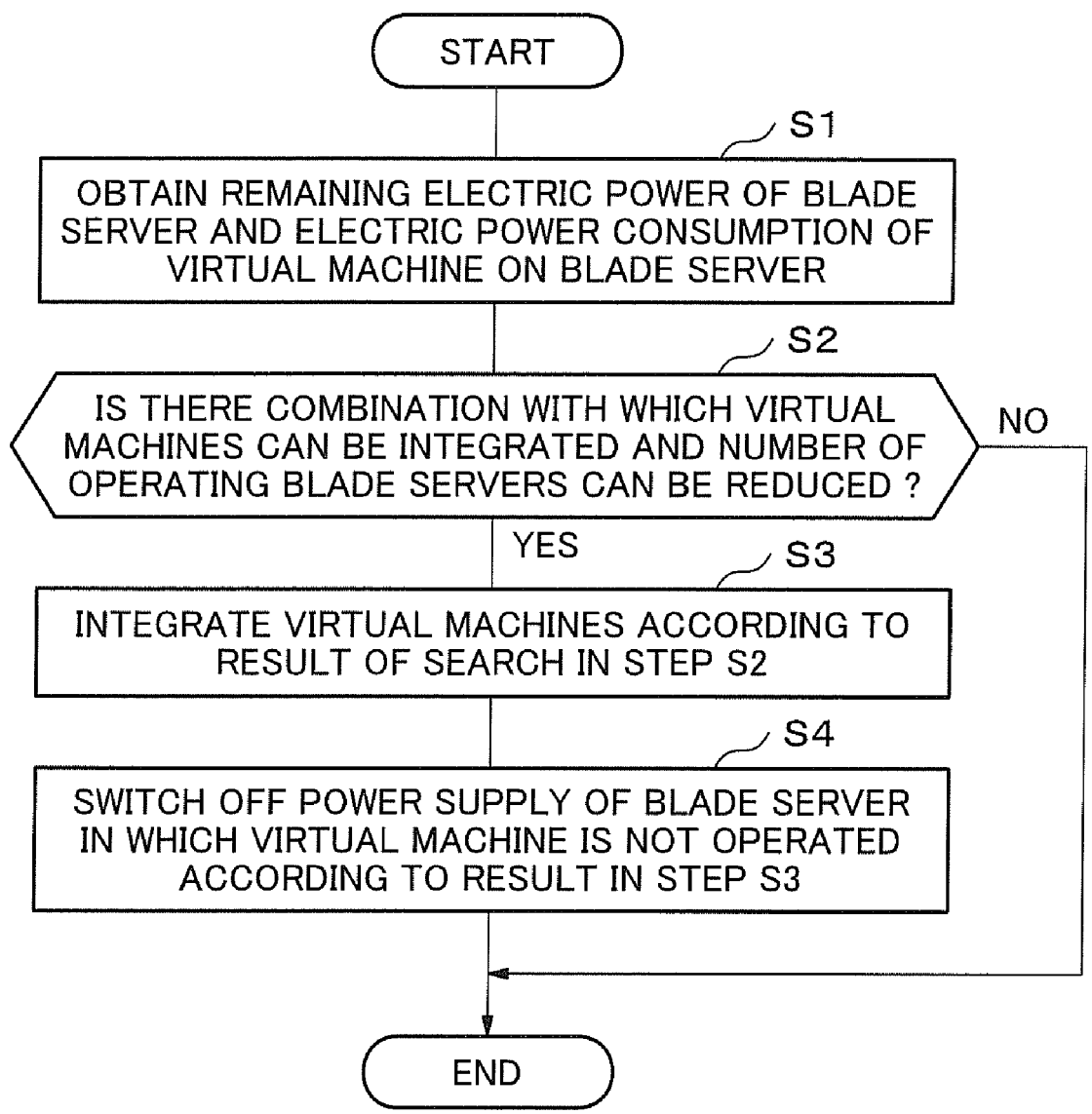

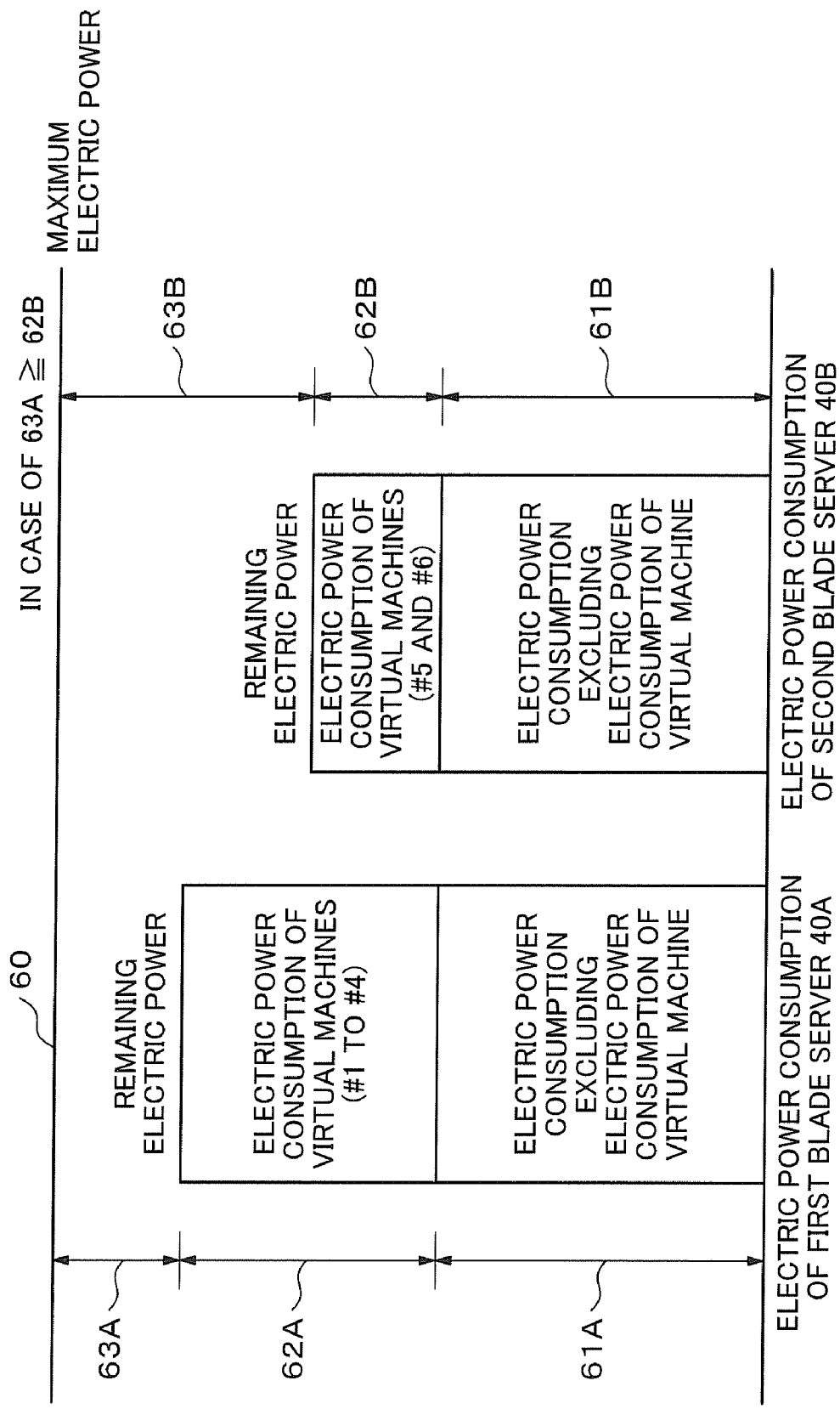

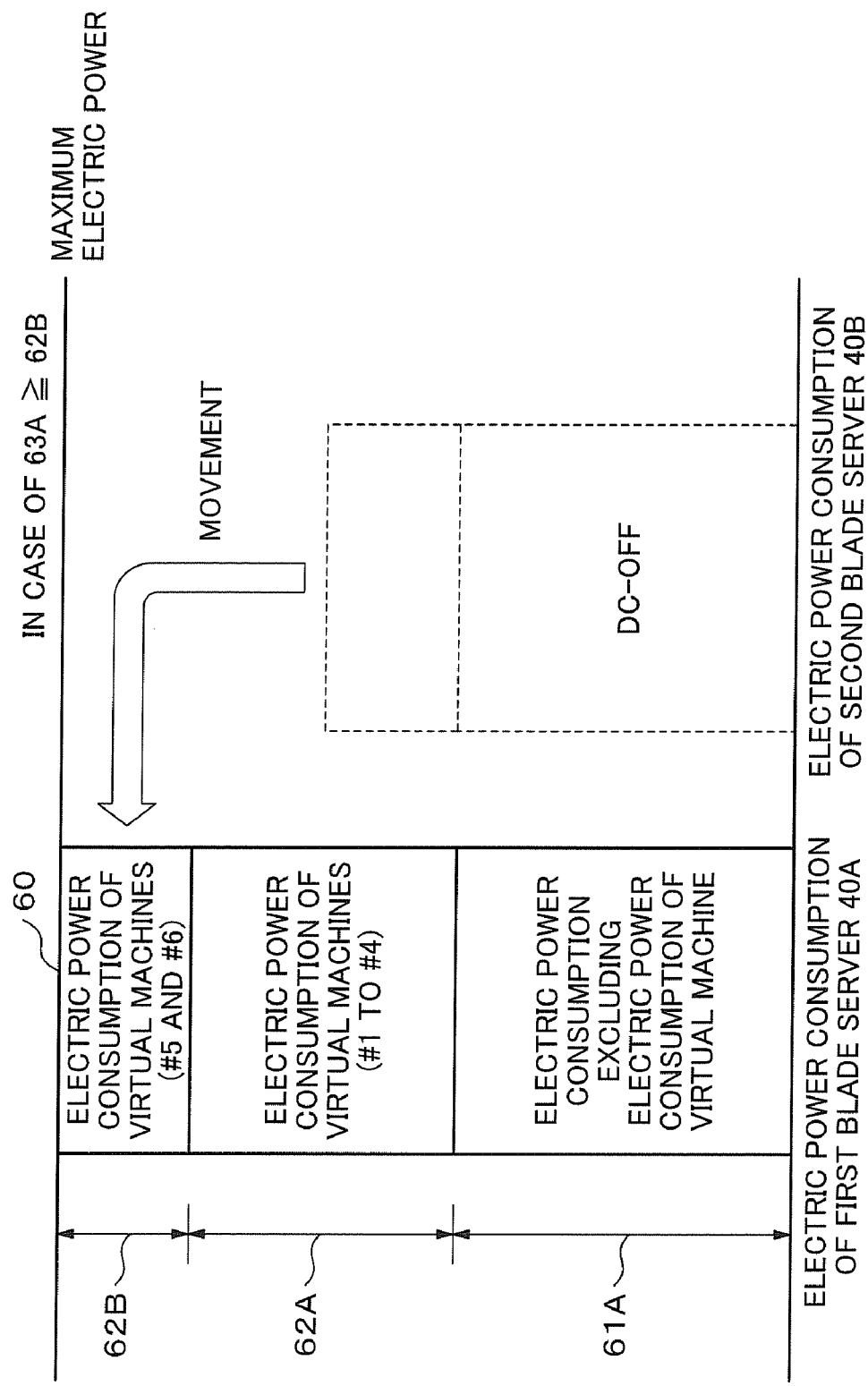

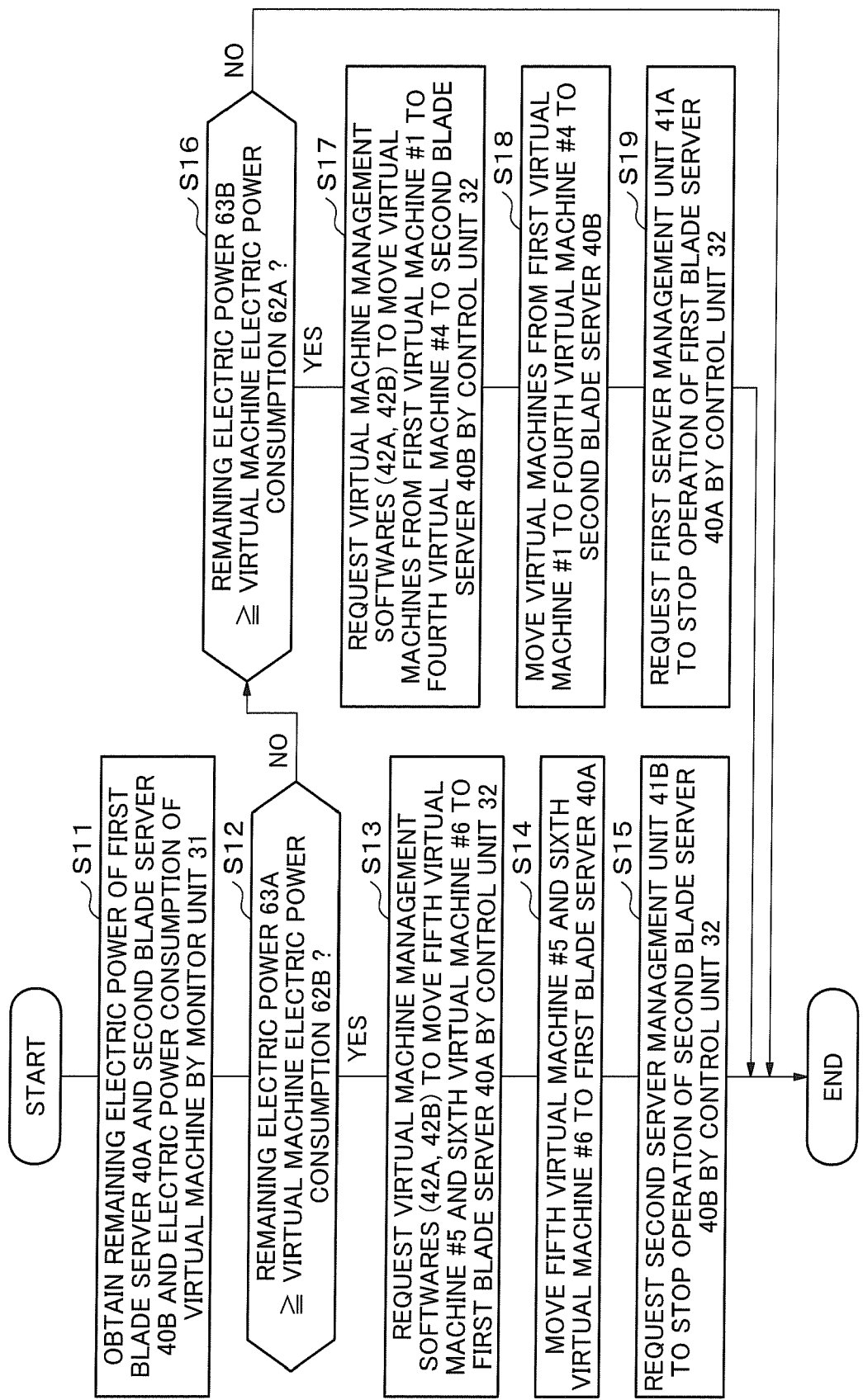

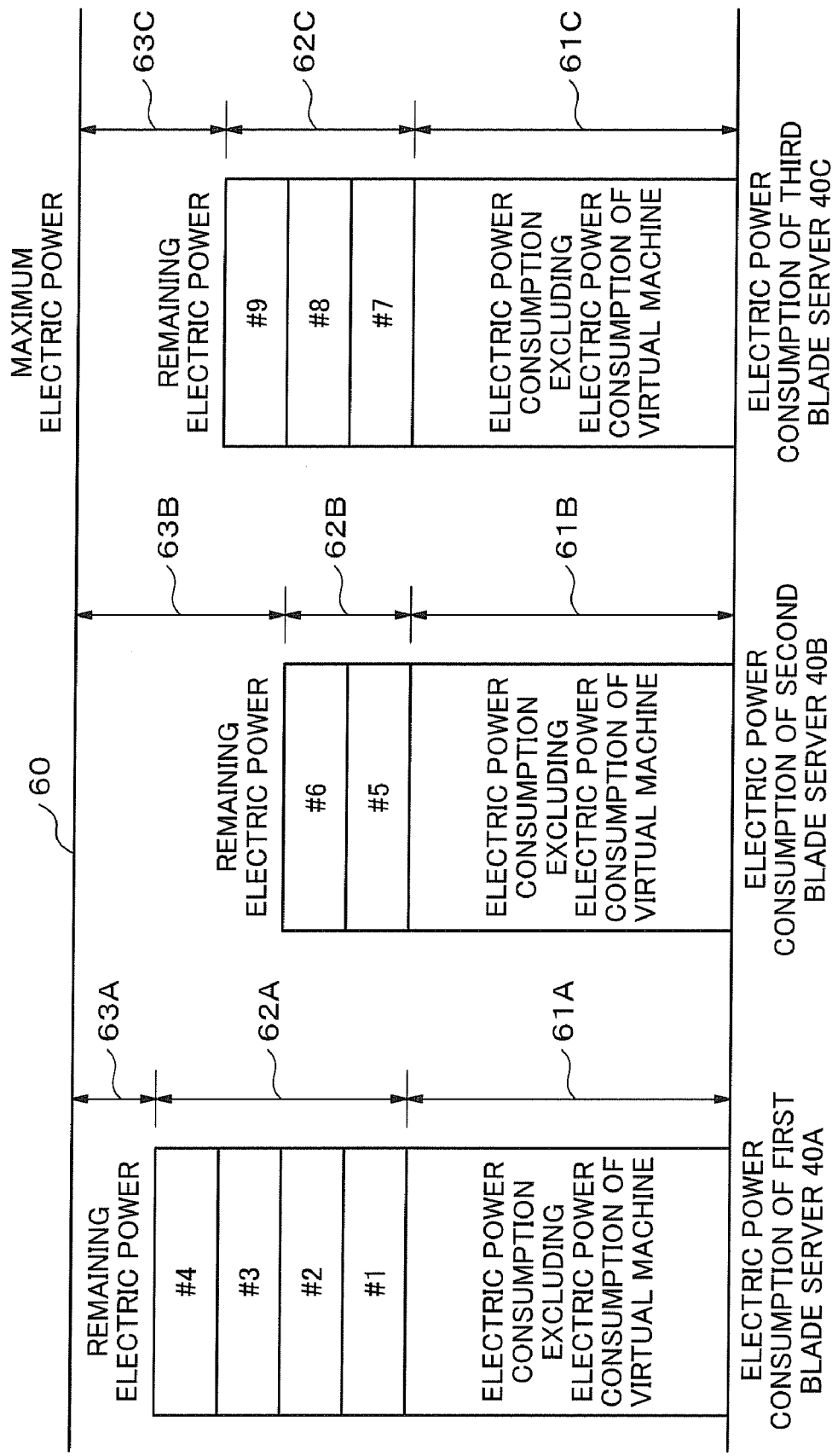

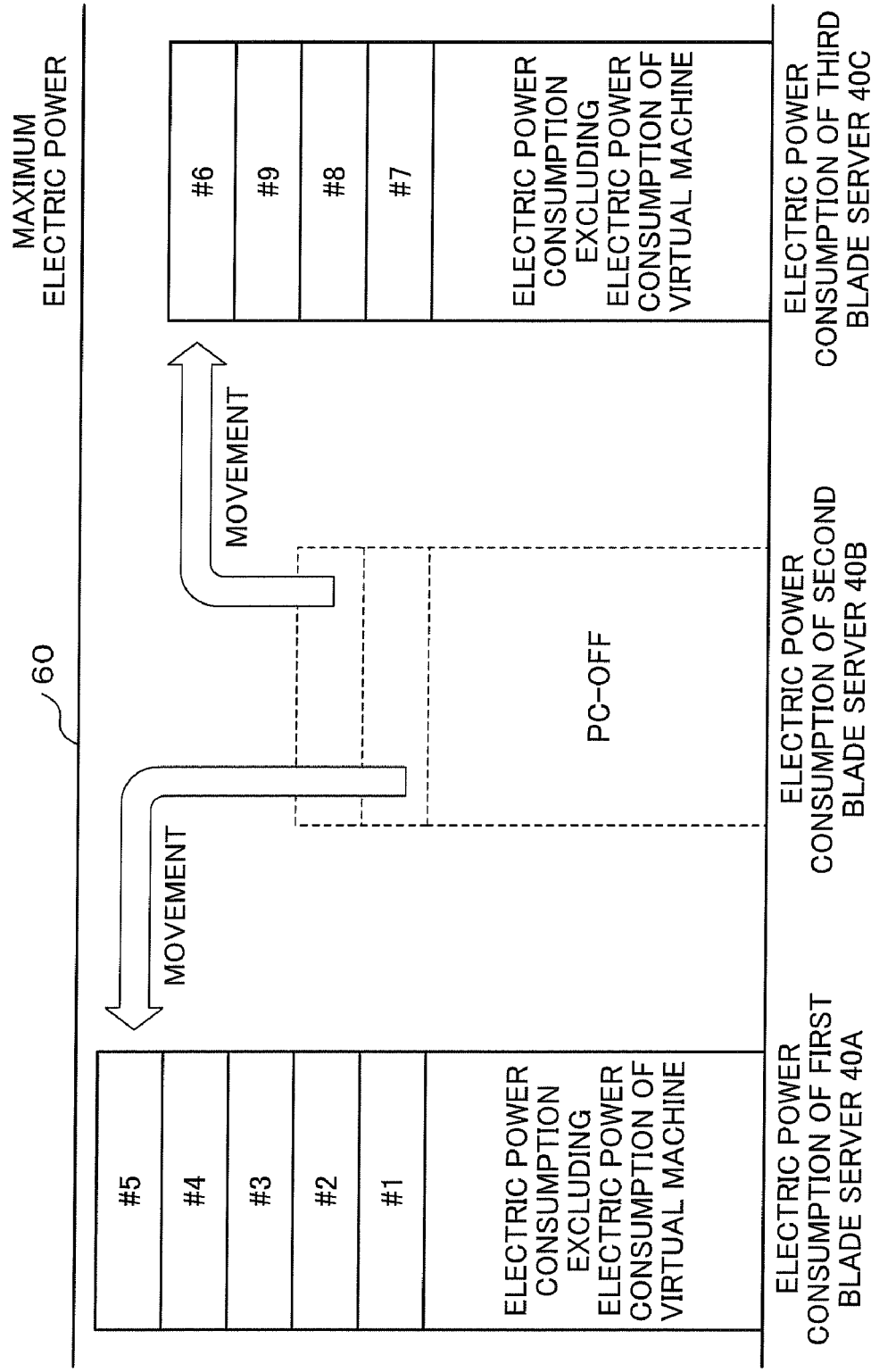

SERVER SYSTEM, REDUCING METHOD OF POWER CONSUMPTION OF SERVER SYSTEM, AND A COMPUTER READABLE MEDIUM THEREOF

This application is based upon and claims the benefit of priority from Japanese patent application No. 2008-009706, filed on Jan. 17, 2008, the disclosure of which is incorporated herein in its entirety by reference.

TECHNICAL FIELD

This invention relates to a server system, a reducing method of power consumption of a server system and a computer readable medium recording thereon a program for reducing the power consumption of a server system, and more particularly, to a server system, a reducing method and a computer readable medium capable flexibly reducing the electric power consumption of the server system based on its actual use state.

BACKGROUND ART

With increasing the processing power of servers, a problem occurs in which the electric power consumption of the server is increased. In order to solve this problem, a method for reducing the power consumption of a server system has been proposed.

Japanese Patent Application Laid-Open No. 2007-213167 discloses a method in which the electric power consumption of a whole system including a computer is compared with a predetermined power limit threshold value. When the electric power consumption of the whole system is equal to or greater than the predetermined power limit threshold value, the electric power consumption of the computer is limited based on a power saving policy that indicates the minimum usable electric power of the computer.

Japanese Patent Application Laid-Open No. 2007-310791 (paragraph numbers 0021 and 0032, and FIGS. 1, 6 and 9) discloses a method in which when a predetermined condition is met, for example, a sever is added to or removed from a computing system, and many tasks are imposed upon (integrated to) a server whose electric power consumption per performance is small within a processing capability of the server that is decided by considering a fixed requirement performance that is set to each task in advance. By using this method, a number of the servers upon which no task is imposed can be increased and the electric power consumption can be reduced.

The electric power consumption of the entire system can be restricted to the predetermined value without reducing a number of computers in the system or decreasing CPU performance of each computer by using the method disclosed in Japanese Patent Application Laid-Open No. 2007-213167. The method disclosed in Japanese Patent Application Laid-Open No. 2007-310791 allows to realize the low power consumption of the whole server system.

However, recently, the CPU performance of servers has been further enhanced. Additionally, because a plurality of high-performance CPUs are mounted in one server, the electric power consumption tends to be increased. When a information processing device which CPUs is mounted on densely, such as a blade server is used, a large amount of electric power has to be supplied. Therefore, the amount of electric power supplied to the information processing device further increases. For this reason, a technology has been sought in which the electric power consumption of the whole server system can be reduced has been sought.

SUMMARY

An exemplary object of the invention is to provide a server system whose electric power consumption can be flexibly reduced according to its actual use state, a method for reducing the power consumption of a server system, and a computer readable medium recording thereon a program for reducing the power consumption of a server system.

According to one aspect of the present invention, a server system comprising: a plurality of servers each having a virtual machine being able to move to the other servers; and a management unit which manages the movement of a virtual machine on a server to another server based on first information showing electric power data and a first condition that the number of servers in operation is reduced as much as possible, and stops supplying electric power to the server having no virtual machine in operation as a result of the movement.

According to one aspect of the present invention, a reducing method of power consumption of a server system including virtual machines which can move among a plurality of servers, comprising: obtaining first information showing an electric power data; moving all the virtual machines on one of the servers to another of the servers based on the first information so as to reduce the number of the servers in operation as much as possible; and stopping supplying the electric power to the server on which no virtual machine has run as s result of the moving.

According to one aspect of the present invention, a computer readable medium recording thereon a program for enabling a computer to execute a reducing method of power consumption of a server system, wherein the server system includes virtual machines which can move among a plurality of servers, the reducing method comprising: obtaining first information showing an electric power data; moving all the virtual machines on one of the servers to another of the servers based on the information so as to reduce the number of the servers in operation as much as possible; and stopping supplying the electric power to the server on which no virtual machine has run as a result of the moving.

BRIEF DESCRIPTION OF THE DRAWINGS

Other features and advantages of the invention will be made more apparent by the following detailed description and the accompanying drawings, wherein:

FIG. 2 is a block diagram showing a concrete configuration of the server system.

FIG. 3 is a flowchart diagram illustrating steps of a process for reducing the electric power consumption of the server system.

FIGS. 4A and 4B are figures illustrating the electric power consumption state of the server system.

FIG. 5 is a flowchart diagram illustrating steps of a process for reducing electric power consumption of the server system.

FIGS. 6A and 6B are figures illustrating an example of a method for reducing power consumption of a server system according to a second exemplary embodiment of the present invention.

In the drawings, the same reference numerals represent the same structural elements.

EXEMPLARY EMBODIMENT

Figure 1:
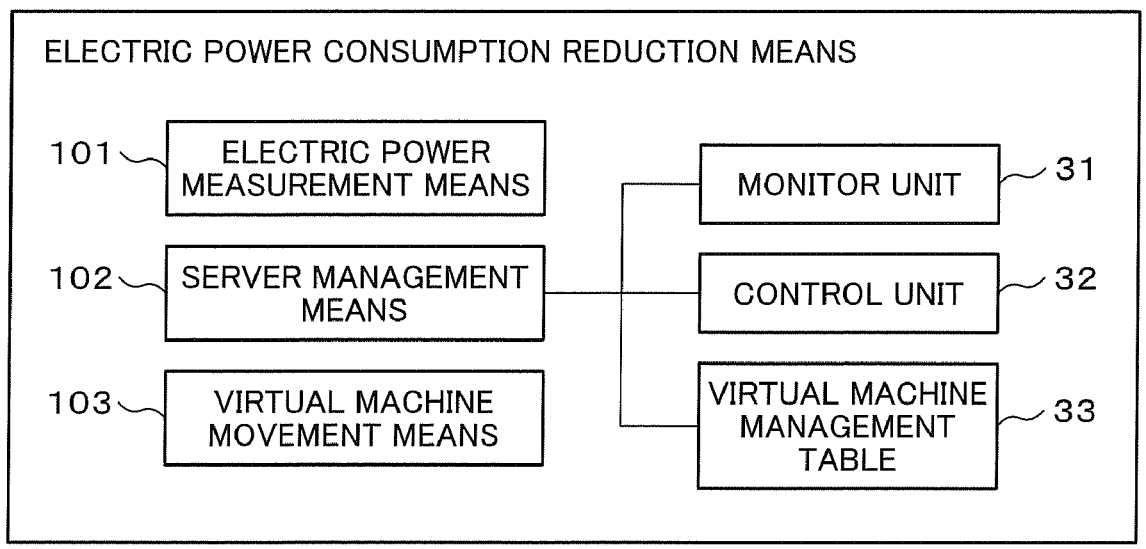
FIG. 1 is a block diagram of a first exemplary embodiment of a server system of the present invention.

A first embodiment of this invention will be described in detail below.

Exemplary Embodiment 1

A first exemplary embodiment of a server system of the present invention includes a plurality of servers and virtual machines which can move among the servers. The server system according to the first exemplary embodiment operates to move a virtual machine on a server to another server based on the information showing electric power data and a rule so as to reduce the number of servers in operation as much as possible. And the server system stops servers on which no virtual machine run as a result of such movement of virtual machines.

For example, the information showing electric power data includes information indicating the real time electric power consumption of a virtual machine and information indicating the real time remaining electric power of a server. "Remaining electric power" is an electric power which is not used in the server actually and it can be calculated by subtracting a total electric power consumption which is an electric power actually consumed in the server from the maximum usable electric power set to the server.

FIG. 1 is a block diagram of a first exemplary embodiment of a server system of the invention.

Referring to FIG. 1, the server system comprises electric power measurement means 101, server management means 102 and virtual machine movement means 103. The virtual machine movement means 103 makes virtual machines move among servers. The server management means 102 is called a management unit.

The electric power measurement means 101 measures the electric power consumption of a power consumption measurement target in each server in real time. The electric power measurement means 101 is, for example, an electric power sensor, and at least measures in real time the total electric power consumption of the virtual machines in each server and the total electric power consumption of the server, exclusive of that total electric power consumption of the virtual machines. When a plurality of virtual machines run on one server, the total electric power consumption may be obtained by measuring the electric power consumption of the virtual machines in the server individually or measuring the total electric power consumption of all the virtual machines on the server at one time. Similarly, the real time total electric power consumption of the server, exclusive of the electric power consumption of the virtual machines, may be obtained by measuring the electric power consumption of individual power consumption measurement targets, measuring the electric power consumption for each group after dividing the power consumption measurement targets into some groups, or measuring the total electric power consumption of the server, exclusive of the electric power consumption of the virtual machines, at one time.

The server management means 102 manages the operating state of the server. The server management means 102 comprises a monitor unit 31, a control unit 32 and a virtual machine management table 33. The monitor unit 31 obtains the real time electric power consumption of the virtual machines and the real time remaining electric power of the server which is calculated from this real time electric power consumption of the virtual machines and the real time electric power consumption of the server, exclusive of the electric power consumption of the virtual machines, which are measured by the electric power measurement means 101, in real time (refer to FIG. 1).

The control unit 32 searches for an optimal assignment of virtual machines to respective servers on the condition that the maximum electric power of the respective servers is not exceeded and on the condition that the number of servers in operation is reduced as much as possible, on the basis of the above-mentioned information obtained by the monitor unit 31, and controls the start and stop of the servers.

The virtual machine management table 33 is connected with the servers via the control unit 32 and it is a table for managing the operating state of virtual machines.

Further, a publicly known technology can be used as the virtual machine movement means 103. Detailed explanation will be given later.

FIG. 2 is a block diagram showing a concrete configuration of the server system in the first exemplary embodiment of the present invention.

A plurality of blade servers (CPU Blades) are located in an enclosure of the server system in the first exemplary embodiment. Hereinafter, an explanation will be made for a case in which three blade servers (a first blade server 40A, a second blade server 40B and a third blade server 40C) are used. The number of blade servers, however, is not limited to three and the present invention can be applied to a case in which plural blade servers other than three servers are used.

Each of the first to third blade servers 40A to 40C is connected to an enclosure management module 30 via a serial bus 10. Each of the first to third blade servers 40A to 40C is also connected to a virtual machine data management unit 50 via a network 20. The enclosure management module 30 can be referred to as a management unit.

Each of blade servers (40A to 40C) comprises a server management unit, virtual machine management software, a network management unit and an electric power sensor. Specifically, the first blade server 40A comprises a first server management unit 41A, first virtual machine management software 42A, a first network management unit 43A and a first electric power sensor 44A. The second blade server 40B comprises a second server management unit 41B, second virtual machine management software 42B, a second network management unit 43B and a second electric power sensor 44B. The third blade server 40C comprises a third server management unit 41C, third virtual machine management software 42C, a third network management unit 43C and a third electric power sensor 44C.

Resources such as a processing device (CPU) and a storage device (memory) are mounted in each blade server. Each blade server is configured so that a plurality of virtual machines can be activated and run in the blade server with a server virtualization technology. The server system in the first exemplary embodiment has nine virtual machines called a first virtual machine #1 to a ninth virtual machine #9.

The resources enough to activate a plurality of virtual machines are ensured for each of the blade servers (40A to 40C) according to the level of the maximum electric power set to each blade server in advance. In this exemplary embodiment, the resources for the first virtual machine #1 to the ninth virtual machine #9 are ensured in each of the blade servers (40A to 40C) in advance.

At the time of the initial activation of the server system, it is set that four virtual machines, that is, the first virtual machine #1, the second virtual machine #2, the third virtual machine #3 and the fourth virtual machine #4 are activated by the first blade server 40A, it is set that two virtual machines, that is, the fifth virtual machine #5 and the sixth virtual machine #6 are activated by the second blade server 40B, and it is set that three virtual machines, that is, the seventh virtual machine #7, the eighth virtual machine #8 and the ninth virtual machine #9 are activated by the third blade server 40C. It goes without saying that the number of virtual machines and the initial setting mentioned above are an example. Therefore, the number and the setting of virtual machines are not limited to the above in particular.

The electric power consumption of each virtual machine changes according to the use state. Under a use state in which the electric power consumption of each of the nine virtual machines composed of the first virtual machine #1 to the ninth virtual machine #9 is small, one blade server, for example, the first blade server 40A runs all the nine virtual machines composed of the first virtual machine #1 to the ninth virtual machine #9. On the other hand, under a use state in which the electric power consumption of the nine virtual machines composed of the first virtual machine #1 to the ninth virtual machine #9 are large or the electric power consumption of some virtual machines out of the nine virtual machines are large, the three blade servers run these virtual machines.

Depending on the maximum electric power value set to each blade server, one blade server cannot run all the nine virtual machines even if the electric power consumption of each of the nine virtual machines composed of the first virtual machine #1 to the ninth virtual machine #9 is small. As a countermeasure against this problem, for example, a configuration in which the resources for half the virtual machines are ensured in one blade server and at least two blade servers are always operated may be used. Further, it is not necessary to say that the maximum electric power value set to each blade server and the resource ensured in the blade server can be independently and arbitrarily set.

The electric power sensors (44A to 44C) correspond to the electric power measurement means 101 shown in FIG. 1, and measure the electric power consumption of virtual machines run on the respective blade servers and the electric power consumption of the respective blade servers, exclusive of the electric power consumption of the virtual machines, in real time. The electric power sensors (44A to 44C) have a function to hold the measured values.

The server management units (41A to 41C) are configured so as to allow communication with the enclosure management module 30 and communication with virtual machine management software (42A to 42C). The server management units (41A to 41C) monitor the state of each of the blade servers, and, in response to instructions from the enclosure management module 30, perform the control (start and stop) of the respective blade servers (40A to 40C).

The server management units (41A to 41C) fetch values (hereinafter called real time virtual machine electric power consumption values) showing the real time electric power consumption of the virtual machines and values (hereinafter called real time server electric power consumption values) showing the real time electric power consumption of the blade servers, exclusive of the electric power consumption of the virtual machines, from the corresponding electric power sensors (44A to 44C). Thus, the server management units obtain real time server electric power consumption values showing the real time electric power consumption of the respective blade servers.

The remaining electric power of the respective servers is calculated from these electric power consumption values and the maximum electric power values set to the respective blade servers. Data showing the real time electric power consumption of the virtual machines and the real time remaining electric power of each blade server is transmitted to the monitor unit 31 of the enclosure management module 30.

The virtual machine management software (42A to 42C) is configured so as to allow communication with the enclosure management module 30 via the server management units (41A to 41C) and allow communication with the virtual machine data management unit 50 via the network management units (43A to 43C). By the virtual machine management software (42A to 42C), upon receipt of instructions from the enclosure management module 30 via the server management units (41A to 41C), the control (start/stop) of the virtual machines is carried out.

The network management units (43A to 43C) are configured so as to allow communication with the virtual machine data management unit 50 and the virtual machine management software (42A to 42C) via the network 20.

The enclosure management module 30 corresponds to the server management means 102 described in FIG. 1 and comprises the monitor unit 31, the control unit 32, the virtual machine management table 33 and the like. The monitor unit 31 is connected to the control unit 32 in the enclosure management module and connected to each blade server via the serial bus 10. Similarly, the control unit 32 is connected to the monitor unit 31 and connected to each blade server via the serial bus 10. The virtual machine management table 33 is connected to each blade server via the control unit 32. The virtual machine management table 33 is a table for managing the state of each of the blade servers (40A to 40C) via the control unit 32.

The monitor unit 31 fetches the real time virtual machine electric power consumption values and the real time server remaining electric power values from the server management units (41A to 41C) in real time. The monitor unit 31 always monitors the state (electric power, temperature, and normality/abnormality) of modules installed in an enclosure such as an I/O module, a FAN module, and a power supply module and the blade server.

The control unit 32 searches for an optimal assignment of virtual machines to the respective severs on the basis of the information obtained by the monitor unit 31 and the information in the virtual machine management table 33 so as to reduce the number of blade servers in operation as much as possible, on the condition that the electric power consumption of the respective servers may not exceed the maximum electric power of the respective servers. The control unit 32 performs the control (start/stop and information setting/obtaining) of each of modules which control the start/stop of the respective blade servers according to the information obtained by the monitor unit 31 and the information in the virtual machine management table 33. The control unit 32 transmits an instruction to perform the control (start/stop) of the virtual machines running on each of the blade servers (40A to 40C) to the server management unit of each blade server.

As the control unit 32 and the virtual machine management table 33 cooperate and function together, the operating state of each of the blade servers (40A to 40C), the state (start/stop) of the virtual machine and the use state of hardware/software can be managed.

Data required for movement of the virtual machines among the servers is stored in the virtual machine data management unit 50 for each of the virtual machines from the first virtual machine #1 to the ninth virtual machine #9. When the virtual machine data management unit 50 receives a request for the movement of a virtual machine from the network management unit, it transmits data, which is stored by the virtual machine data management unit 50 and is necessary for movement of the requested virtual machine, to one of the virtual machine management software (42A to 42C) that is in the server of the destination of that virtual machine. Data required for movement of the virtual machine is copied into the destination blade server. Further, in addition to the time of movement of a virtual machine between servers, at the time of the activation of a virtual machine, the virtual machine is activated by using a similar method.

Next, a method for reducing the power consumption of the server system in the first exemplary embodiment will be described with reference to FIGS. 3 to 5. FIG. 3 is a flowchart diagram illustrating steps of a process for reducing the electric power consumption of the server system in the first exemplary embodiment. When a plurality of blade servers are operated, a program for reducing electric power consumption is executed. The operating statuses of the plurality of blade servers are grasped by the monitor unit 31 of the enclosure management module 30.

First, the monitor unit 31 in the enclosure management module 30 fetches electric power information about the remaining electric power of blade servers in operation and the electric power consumption of the virtual machines on the operating blade servers (Step 1). The electric power consumption of the virtual machines and the remaining electric power of the operating blade servers are obtained by measuring the electric power consumption of the power consumption measurement target in real time with the electric power sensor arranged in each blade server. This measured value is read into the server management unit in each blade server and transmitted to the monitor unit 31 in the enclosure management module 30 via the serial bus 10. By this means, the monitor unit 31 obtains the electric power information about the remaining electric power of the operating blade servers and the electric power consumption of the virtual machines on those servers.

Next, An optimal assignment of virtual machines to the respective severs is searched for on the basis of the information obtained by the monitor unit 31 and the information in the virtual machine management table 33 so as to reduce the number of blade servers in operation as much as possible, on the condition that the electric power consumption of the respective servers may not exceed the maximum electric power of the respective servers (Step 2). When such an assignment has not been searched for, the execution of the program for reducing electric power consumption is halted. On the other hand, when an appropriate assignment has been searched for, virtual machines are moved among the servers in accordance with that assignment (Step 3). After that, the power supply to the blade server(s) on which no virtual machine has run as a result of the above-mentioned virtual machine movement is turned off (Step 4).

FIGS. 4A and 4B are figures illustrating the electric power consumption state of the server system in the first exemplary embodiment. FIG. 5 is a flowchart diagram illustrating steps of a process for reducing electric power consumption of the server system in the first exemplary embodiment. Further, FIG. 4 and FIG. 5 are figures illustrating the operation of the server system in which two blade servers, or the first blade server 40A and the second blade server 40B, are in operation and six virtual machines, or the first virtual machine #1 to the sixth virtual machine #6, run. It is not necessary to say that the configuration of the server system shown in FIG. 4 and FIG. 5 is an example. Although the maximum electric power 60 of the first blade server 40A is equal to that of the second blade server 40B in FIGS. 4A and 4B, it is not necessary to say that different maximum electric power values can be set for the blade servers, respectively.

First, the monitor unit 31 in the enclosure management module 30 obtains information about the electric power consumption and the remaining electric power of the first blade server 40A and the second blade server 40B in operation (Step 11). In this embodiment, the electric power consumption of the first blade server 40A, exclusive of the electric power consumption of the virtual machines, is shown as electric power consumption 61A. And the total electric power consumption of the virtual machines run on the first blade server 40A is shown as total electric power consumption 62A. And the remaining electric power to the maximum electric power which can be used by the first blade server 40A is shown as a remaining electric power 63A. In this embodiment, the electric power consumption of the second blade server 40B, exclusive of the electric power consumption of the virtual machines, is shown as electric power consumption 61B. And the total electric power consumption of the virtual machines run on the second blade server 40B is shown as total electric power consumption 62B. And the remaining electric power to the maximum electric power which can be used by the second blade server 40B is shown as a remaining electric power 63B.

In the example shown in FIG. 4A, the total electric power consumption 62A of the virtual machines is the sum of the electric power consumption of four virtual machines, or the first virtual machine #1 to the fourth virtual machine #4. The total electric power consumption 62B of the virtual machines is the sum of the electric power consumption of two virtual machines, or the fifth virtual machine #5 to the sixth virtual machine #6.

Next, the control unit 32 in the enclosure management module 30 determines whether or not both of the fifth virtual machine #5 and the sixth virtual machine #6 on the second blade server 40B can be moved to the first blade server 40A under the limitation of the maximum electric power 60 of the first blade server 40A (Step 12). In other words, the control unit 32 determines whether or not the remaining electric power 63A is greater than or equal to the total electric power consumption 62B of the virtual machines, with respect to the combination of the remaining electric power 63A of the first blade server 40A and the total electric power consumption 62B of two virtual machines, or the fifth virtual machine #5 to the sixth virtual machine #6, which run on the second blade server 40B.

When the remaining electric power 63A is greater than or equal to the total electric power consumption 62B of the virtual machines (refer to FIG. 4A), the control unit 32 requests the first virtual machine management software 42A and the second virtual machine management software 42B to move the fifth virtual machine #5 and the sixth virtual machine #6 from the second blade server 40B to the first blade server 40A (Step 13). By this request, the fifth virtual machine #5 and the sixth virtual machine #6 are moved from the second blade server 40B to the first blade server 40A (Step 14). A publicly known technology can be used for movement of the virtual machines. For example, the Vmotion function provided by VMware corporation or the like can be used.

When the second virtual machine management software 42B which controls the fifth virtual machine #5 and the sixth virtual machine #6 receives the request for movement from the control unit 32, it communicates with the virtual machine data management unit 50 via the second network management unit 43B, copies movement information (activation information) on the fifth virtual machine #5 and the sixth virtual machine #6 stored in the virtual machine data management unit 50 and stores it in the first blade server 40A.

Next, the latest data about the virtual machine #5 and the sixth virtual machine #6 which run on the second blade server 40B is transferred from the second blade server 40B to the first blade server 40A via a dedicated network line (not shown) connecting the second blade server 40B and the first blade server 40A. As a result, data about the fifth virtual machine #5 and the sixth virtual machine #6 stored in the first blade server 40A and the data about the fifth virtual machine #5 and the sixth virtual machine #6 stored in the second blade server 40B become equal.

After that, when the monitor unit 31 confirms that the fifth virtual machine #5 and the sixth virtual machine #6 run on the first blade server 40A, the control unit 32 instructs the second server management unit 41B in the second blade server 40B to stop the operation of the fifth virtual machine #5 and the sixth virtual machine #6 on the second blade server 40B. The movement of the fifth virtual machine #5 and the sixth virtual machine #6 is completed in this manner.

Next, the control unit 32 requests the second server management unit 41B to stop the operation of the second blade server 40B (Step 15). As a result, the power supply to the second blade server 40B is turned off as shown in FIG. 4B.

Unlike the example shown in FIG. 4, when the remaining electric power 63A is smaller than the total electric power consumption 62B of the virtual machines in step 12, the control unit 32 determines whether or not the virtual machines on the first blade server 40A can be moved to the second blade server 40B (Step 16). In other words, the control unit 32 determines whether or not the remaining electric power 63B is greater than or equal to the total electric power consumption 62A of the virtual machines, with respect to the combination of the remaining electric power 63B of the second blade server 40B and the total electric power consumption 62A of four virtual machines, or the first virtual machine #1 to the fourth virtual machine #4, that run on the first blade server 40A. Further, the processes in the above-mentioned step 12 and step 16 correspond to the process for searching for an optimal assignment of virtual machines to servers on the condition that the electric power consumption of the respective servers may not exceed the maximum electric power of the respective servers in step 2 shown in FIG. 3.

When the remaining electric power 63B is greater than or equal to the total electric power consumption 62A of the virtual machines, the control unit 32 requests the first virtual machine management software 42A and the second virtual machine management software 42B to move the first virtual machine #1 through the fourth virtual machine #4 from the first blade server 40A to the second blade server 40B (Step 17). By this request, the first virtual machine #1 to the fourth virtual machine #4 are moved from the first blade server 40A to the second blade server 40B by the same process mentioned above (Step 18).

Next, the monitor unit 31 confirms that data on the first virtual machine #1 to the fourth virtual machine #4 becomes latest data on the second blade server 40B and the first virtual machine #1 to the fourth virtual machine #4 run on the second blade server 40B. When the above confirmation is made by the monitor unit 31, the control unit 32 instructs the first server management unit 41A in the first blade server 40A to stop the operation of the first virtual machine #1 to the fourth virtual machine #4 on the first blade server 40A. Next, the control unit 32 requests the first server management unit 41A to stop the operation of the first blade server 40B (Step 19). By this request, the power supply to the first blade server 40A is turned off.

When the remaining electric power 63B is smaller than the total electric power consumption 62A of the virtual machines in step 16 mentioned above, the current state is maintained. That is, the state of the first blade server 40A and the second blade server 40B is not changed and those are operated while keeping the current state.

After the movement of virtual servers is performed in the above-mentioned step and a lower power consumption of the whole server system is realized, a case in which the electric power consumption of a blade server reaches its maximum electric power may occur in a certain use condition of the virtual machines. In this case, another blade server is newly activated and one or more virtual machines on the blade server in question are moved to the newly activated blade server. Like this, the electric power consumption of virtual machines varies according to their use condition. Therefore, it is desirable to set the electric power values with a margin which is greater than the real time actual electric power consumption of each virtual machine by considering fluctuation of the electric power consumption value of the virtual machine in advance.

In the example shown in FIG. 4B, when the electric power consumption of the first blade server 40A reaches its maximum electric power, the control unit 32 activates the second blade server 40B. And, for example, the control unit 32 moves two virtual machines, which are the fifth virtual machine #5 and the sixth virtual machine #6, from the first blade server 40A to the second blade server 40B by the same method as mentioned above.

Further, as mentioned above, a publicly known technology can be used for movement of the virtual machines accordingly and it is not limited to the above-mentioned method. For example, in the example shown in FIG. 4A, a method may be used in which when the fifth virtual machine #5 and the sixth virtual machine #6 on the second blade server 40B receive a request for movement to the first blade server 40A, the latest data on the fifth virtual machine #5 and the sixth virtual machine #6 of the second blade server 40B is transmitted to the virtual machine management unit 50, and just after the control unit 32 instructs the second virtual machine management software 42B to stop the operation of the fifth virtual machine #5 and the sixth virtual machine #6.

Additionally, another method may be used in which the control unit 32 requests the second server management unit 41B to stop the operation of the second blade server 40B and, after that, it requests the first virtual machine management software 42A to activate the fifth virtual machine #5 and the sixth virtual machine #6.

In the first exemplary embodiment, a method is used in which virtual machines are moved from one server to another server according to the real time electric power consumption of the virtual machines and the real time remaining electric power of the server so as to reduce a number of operating servers as much as possible and stops the operation of the server in which no virtual machine has run as a result of such virtual machine movement. Therefore, the electric power consumption of the whole server system can be reduced flexibly according to the actual use state.

By using the server system in the first exemplary embodiment, the whole electric power consumption can be reduced while keeping the performance of virtual machines. This is because a mechanism is used in which the enclosure management module 30 can grasp the electric power consumption of each blade server in real time and virtual machines on a first blade server are moved to a second blade server on the condition that the electric power consumption of the second server may not exceed the maximum electric power of the second server.

The server system in the first exemplary embodiment can control a plurality of virtual machines on a plurality of blade servers by the enclosure management module 30 autonomously and integrally. This is because means for directly controlling the virtual machines by the enclosure management module 30 via the server management units (41A to 41C) is provided.

Special software is not required for the server system in the first exemplary embodiment. This is because means for directly controlling virtual machines by the enclosure management module 30 via the server management unit is provided.

Although blade servers are taken as an example of servers in the first exemplary embodiment, the present invention can be applied to a system using conventional servers other than blade servers by using the same mechanism as mentioned above.

Exemplary Embodiment 2

Next, a second exemplary embodiment of this invention will be described in detail. Further, in subsequent description, the same reference numbers are used for the elements having the same function as the above-mentioned first exemplary embodiment and the description of the elements will be omitted appropriately.

A basic configuration and the operation of a server system in the second exemplary embodiment are the same as those of the first exemplary embodiment, except for the following points: That is, when the server system in the above-mentioned first exemplary embodiment searches for an optimal assignment of virtual machines to servers on the condition that the electric power consumption of the respective servers may not exceed the maximum electric power of the respective servers, according to the information obtained by the monitor unit, it performs a search by comparing the total electric power consumption value of a plurality of virtual machines in one blade server with the remaining electric power of the server. On the other hand, in the second exemplary embodiment, the search is performed by comparing the electric power consumption of each of the virtual machines in one blade server with the remaining electric power of the server. This is the difference.

FIGS. 6A and 6B are figures illustrating the state of the electric power consumption of the server system according to the second exemplary embodiment. In the second exemplary embodiment, a case in which three server blades, that is, the first server blade 40A, the second server blade 40B and the third server blade 40C, run and all nine virtual machines composed of the first virtual machine #1 to the ninth virtual machine #9 run will be described as an example.

For convenience of the explanation, the explanation will be made for a case in which the maximum electric powers 60 of the three blade servers composed of the first blade server 40A to the third blade server 40C are the same as each other.

First, the monitor unit 31 in the enclosure management module 30 obtains information on an electric power consumption and a remaining electric power of the first blade server 40A, the second blade server 40B and the third blade server 40C which run. In this embodiment, the electric power consumption of the third blade server 40C excluding the electric power consumption of the virtual machine is an electric power consumption 61C. And the total electric power consumption of the virtual machines which run in the third blade server 40C is a total electric power consumption 62C. And the remaining electric power to the maximum electric power which can be used by the third blade server 40C is a remaining electric power 63C. In the example shown in FIG. 6A, the total electric power consumption 62A of the virtual machines is a sum of the electric power consumptions of four virtual machines composed of the first virtual machine #1 to the fourth virtual machine #4. The total electric power consumption 62B of the virtual machine is a sum of the electric power consumptions of two virtual machines composed of the fifth virtual machine #5 and the sixth virtual machine #6. The total electric power consumption 62C of the virtual machines is a sum of the electric power consumptions of three virtual machines composed of the seventh virtual machine #7 to the ninth virtual machine #9.

The second exemplary embodiment of a server system of the present invention does not compare the total electric power consumption of the virtual machines with the remaining electric power. And the server system compares the electric power consumption of each of the virtual machines with the remaining electric power. In other words, the search is performed by comparing the electric power consumption of each of the virtual machines in one blade server with the remaining electric power of the server when searching for an optimal assignment of the virtual machines to the servers on the condition that the electric power consumption of the respective servers may not exceed the maximum electric power of the respective servers on the basis of the information obtained by the monitor unit.

In the second exemplary embodiment, a case in which the electric power consumption of the fifth virtual machine #5 is smaller than the remaining electric power of the first blade server 40A and the electric power consumption of the sixth virtual machine #6 is smaller than the remaining electric power of the third blade server 40C will be described as an example. As well as the above-mentioned first exemplary embodiment, the control unit 32 searches for an optimal assignment of the virtual machines to the servers on the condition that the electric power consumption of the respective servers may not exceed the maximum electric power of the respective servers. According to the search result, the fifth virtual machine #5 is moved to the first blade server 40A and the sixth virtual machine #6 is moved to the third blade server as shown in FIG. 6B. Accordingly, no virtual machine runs by the second blade server 40B and a power supply of the second blade server can be turned off. As a result, low power consumption of the server system can be realized.

In the second exemplary embodiment of the server system, because the electric power consumption of each of the virtual machines is compared with the remaining electric power of the server, low power consumption of the server system can be efficiently realized.

While this invention has been described in conjunction with the preferred embodiments described above, it will now be possible for those skilled in the art to put this invention into practice in various other manners.

What is claimed is:

1. A server system comprising:
   a plurality of servers each having one or more virtual machines being able to move to the other servers; and
   a management unit which manages the movement of one or more virtual machines on one of said servers to another of said servers based on first information showing electric power data and a first condition that the number of servers in operation is reduced as much as possible, and stops supplying electric power to the server having no virtual machine in operation as a result of said movement,
   wherein said first information includes information indicating real time electric power consumption in each of said one or more virtual machines and information indicating real time remaining electric power in each of said servers, said real time remaining electric power in said each of said servers being calculated by extracting real time electric power consumption in said one or more virtual machines on said each of said servers and real time electric power consumption excluding said real time electric power consumption in said one or more virtual machines on said each of said servers from maximum electric power for said each of said servers, wherein said management unit includes a control unit which searches for an optimal assignment of virtual machines to said servers on said first condition and a second condition that, for each of said servers, said real time remaining electric power in said each of said servers is greater than or equal to said real time electric power consumption in one or more virtual machines moved to said each of said servers, and controls the start and stop of said servers.

2. The server system according to claim 1, wherein said management unit further includes a monitor unit for obtaining said first information in real time.

3. The server system according to claim 2, wherein said management unit includes a virtual machine management table for managing the operating state of each of said virtual machines, and said control unit searches for said optimal assignment of virtual machines to said servers on said first condition, said second condition, and said virtual machine management table.

4. The server system according to claim 1, further comprising a virtual machine data management unit in which data required for movement of virtual machines among said servers is stored, wherein each of said servers decides whether to move one or more virtual machines on said each of said servers to another server based on said data stored in said virtual machine data management unit.

5. The server system according to claim 1, wherein said servers are blade servers.

6. A reducing method of power consumption of a server system including virtual machines which can move among a plurality of servers, comprising:

obtaining first information showing an electric power data;

moving one or more virtual machines on one of said servers to another of said servers based on said first information and a first condition that the number of said servers in operation is reduced as much as possible; and stopping supplying the electric power to the server having no virtual machine in operation as a result of said moving, wherein said first information includes information indicating real time electric power consumption in each of said one or more virtual machines and information indicating real time remaining electric power in each of said servers, said real time remaining electric power in said each of said servers being calculated by extracting real time electric power consumption in said one or more virtual machines on said each of said servers and real time electric power consumption excluding said real time electric power consumption in said one or more virtual machines on said each of said servers from maximum electric power for said each of said servers, wherein said moving searches for an optimal assignment of virtual machines to said servers on said first condition and a second condition that, for each of said servers, said real time remaining electric power in said each of said servers is greater than or equal to said real time electric power consumption in one or more virtual machines moved to said each of said servers.

7. The reducing method according to claim 6, wherein said obtaining obtains said first information in real time.

8. The reducing method according to claim 7, wherein said searching searches for said optimal assignment of virtual machines to said servers on said first condition, said second condition, and a virtual machine management table for managing the operating state of each of said virtual machines.

9. The reducing method according to claim 6, further comprising deciding whether to move on or more virtual machines on each of said servers to another server based on data requirement for machine of virtual machines among said servers.

10. A non-transitory computer readable medium recording thereon a program for enabling a computer to execute a reducing method of power consumption of a server system, wherein said server system includes virtual machines which can move among a plurality of servers, the reducing method comprising:

obtaining first information showing an electric power data;

moving one or more virtual machines on one of said servers to another of said servers based on said first information and a first condition that the number of said servers in operation is reduced as much as possible; and stopping supplying the electric power to the server having no virtual machine in operation as a result of said moving, wherein said first information includes information indicating real time electric power consumption in each of said one or more virtual machines and information indicating real time remaining electric power in each of said servers, said real time remaining electric power in said each of said servers being calculated by extracting real time electric power consumption in said one or more virtual machines on said each of said servers and real time electric power consumption excluding said real time electric power consumption in said one or more virtual machines on said each of said servers from maximum electric power for said each of said servers, wherein said moving searches for an optimal assignment of virtual machines to said servers on said first condition and a second condition that, for each of said servers, said real time remaining electric power in said each of said servers is greater than or equal to said real time electric power consumption in one or more virtual machines moved to said each of said servers.

11. The non-transitory computer readable medium according to claim 10, wherein said obtaining obtains said first information in real time.

12. The non-transitory computer readable medium according to claim 11, wherein said searching searches for said optimal assignment of said virtual machines to said servers on said first condition, said second condition, and a virtual machine management table for managing the operating state of each of said virtual machines.

13. The non-transitory computer readable medium according to claim 10, wherein said reducing method further comprises deciding whether to move one or more virtual machines on each of said servers to another server based on data required for movement of virtual machines among said servers.

* * * * *